(12) United States Patent
Sumi et al.

(10) Patent No.: US 10,363,701 B2
(45) Date of Patent: Jul. 30, 2019

(54) METHOD FOR PRODUCING INORGANIC SUBSTANCE POWDER HIGHLY-ORIENTED THIN FILM SHEET

(71) Applicant: TBM CO., LTD., Chiyoda-ku, Tokyo (JP)

(72) Inventors: Yuichiro Sumi, Tokyo (JP); Naoyuki Kawamata, Kodaira (JP)

(73) Assignee: TBM CO., LTD., Tokyo (JP)

( * ) Notice: Subject to any disclaimer, the term of this patent is extended or adjusted under 35 U.S.C. 154(b) by 0 days.

(21) Appl. No.: 15/208,938

(22) Filed: Jul. 13, 2016

(65) Prior Publication Data

US 2016/0318232 A1 Nov. 3, 2016

Related U.S. Application Data

(62) Division of application No. 14/122,940, filed as application No. PCT/JP2012/063412 on May 18, 2012.

(30) Foreign Application Priority Data

May 31, 2011 (JP) .................................. 2011-122784
May 11, 2012 (JP) .................................. 2012-109896

(51) Int. Cl.
*B29C 55/00* (2006.01)
*B29C 48/08* (2019.01)
(Continued)

(52) U.S. Cl.
CPC .............. *B29C 55/005* (2013.01); *B29B 7/48* (2013.01); *B29C 48/0018* (2019.02);
(Continued)

(58) Field of Classification Search
CPC .............. B29C 55/005; B29C 47/0021; B29C 47/0057; B29C 47/0059; B29C 55/30; B29C 67/224; B41M 5/5218; C08J 5/18
See application file for complete search history.

(56) References Cited

U.S. PATENT DOCUMENTS 3,929,950 A * 12/1975 Nakamura ............ B29C 67/202
264/210.4
4,037,004 A * 7/1977 Nakano .................. B41M 5/128
427/145
(Continued)

FOREIGN PATENT DOCUMENTS

CN 101160209 A 4/2008
JP 1981043850 A 10/1981
(Continued)

OTHER PUBLICATIONS

Extended European Search Report corresponding to Application No. 12792721.8-1308/2716696, PCT/JP2012/063412; dated Apr. 21, 2015.
(Continued)

*Primary Examiner* — Stella K Yi
(74) *Attorney, Agent, or Firm* — Cantor Colburn LLP

(57) ABSTRACT

The problem addressed by the invention lies in providing a method for producing an inorganic substance powder highly-oriented thin film sheet with which it is possible to produce a sheet of uniform thickness while preventing the generation of impurities, improving sheet surface properties, adjusting apparent specific gravity, and the like. The method for producing a thin film sheet comprises a step for preparing a predetermined inorganic substance powder, thermoplastic resin, and auxiliary agent, a step for exposing the starting materials mixed at a predetermined mixture ratio to high shear stress while kneading, a step for feeding the kneaded starting materials to a T die-type extrusion molding device
(Continued)

and molding a sheet, and a step for adjusting the apparent gravity as desired by stretching under predetermined conditions.

4 Claims, 3 Drawing Sheets

(51) Int. Cl.
    *B29C 48/00*     (2019.01)
    *C08J 5/18*     (2006.01)
    *B41M 5/52*     (2006.01)
    *B29B 7/48*     (2006.01)
    *B29C 55/02*     (2006.01)
    *B29C 55/30*     (2006.01)
    *B29K 23/00*     (2006.01)
    *B29K 105/16*     (2006.01)
    *B29L 7/00*     (2006.01)
    *B29C 48/88*     (2019.01)

(52) U.S. Cl.
    CPC .............. *B29C 48/08* (2019.02); *B29C 55/02* (2013.01); *B29C 55/30* (2013.01); *B41M 5/5218* (2013.01); *C08J 5/18* (2013.01); *B29C 48/914* (2019.02); *B29K 2023/065* (2013.01); *B29K 2105/16* (2013.01); *B29K 2995/0025* (2013.01); *B29L 2007/002* (2013.01); *C08J 2323/06* (2013.01)

(56) References Cited

U.S. PATENT DOCUMENTS

| | | | |
|---|---|---|---|
| 5,670,225 | A | 9/1997 | Yamanaka et al. |
| 6,194,506 | B1 | 2/2001 | Ochiai et al. |
| 6,437,048 | B1 | 8/2002 | Saito |
| 6,472,445 | B1 | 10/2002 | Takahashi |
| 6,576,325 | B1 | 6/2003 | Yamanaka |
| 2002/0041060 | A1 | 4/2002 | Liang |
| 2003/0017321 | A1* | 1/2003 | Iwasa ................. B41M 5/508 428/308.4 |
| 2009/0098364 | A1 | 4/2009 | Honda et al. |
| 2009/0324979 | A1 | 12/2009 | Roussel et al. |
| 2013/0081770 | A1 | 4/2013 | Huang et al. |

FOREIGN PATENT DOCUMENTS

| | | | |
|---|---|---|---|
| JP | 61273941 | A | 12/1986 |
| JP | 04335043 | A | 11/1992 |
| JP | 07314622 | A | 12/1995 |
| JP | 08225680 | A | 9/1996 |
| JP | H09066564 | A | 3/1997 |
| JP | 11277623 | A | 10/1999 |
| JP | 2000211008 | A | 8/2000 |
| JP | 200172890 | A | 3/2001 |
| JP | 2001181425 | A | 7/2001 |
| JP | 0003496992 | | 11/2003 |
| JP | 2005145997 | A | 9/2005 |
| JP | 2007119767 | A | 5/2007 |
| JP | 2011031623 | A | 2/2011 |
| WO | 9720869 | A1 | 6/1997 |
| WO | 036040 | A1 | 6/2000 |
| WO | 2008124906 | A2 | 10/2008 |

OTHER PUBLICATIONS

International Search Report for International Application No. PCT/JP2012/063412; dated Jul. 17, 2012.
Notice of Reasons for Rejection issued to JP Application No. 2012-109896, dated Nov. 12, 2013.
Notification that the Japan Patent Office has received an Information Statement from a Third Party issued to Japanese application patent No. 2012-109896, dated Jan. 28, 2014.
Publication 3, [online]; [retrieved on Feb. 7, 2014]; retrieved from Internet http://www.bihokufunka.co.jp/html.softon_h1.htm. (English translation not available).
Second Office Action issued to CN Application No. 201280025922.7; dated Jan. 15, 2015.
Intellectual Property India, Office Action for corresponding Application No. 9961/DELNP/2013; dated Dec. 15, 2017.

* cited by examiner

METHOD FOR PRODUCING INORGANIC SUBSTANCE POWDER HIGHLY-ORIENTED THIN FILM SHEET

CROSS REFERENCE TO RELATED APPLICATIONS

The present application is a divisional application of U.S. patent application Ser. No. 14/122,940, filed on Nov. 27, 2013, the entire contents of which are incorporated herein by reference. The Ser. No. 14/122,940 is the U.S. National Stage of Application No. PCT/JP2012/063412, filed on 18 May 2012. The application claimed the benefit of the date of the earlier filed Japanese Patent Application No. 2011-122784, filed 31 May 2011 and Japanese Application No. 2012-109896, filed 11 May 2012, priority to which are also claimed herein, and the contents of which are also incorporated by reference herein.

TECHNICAL FIELD

The present invention relates to a method for producing an inorganic substance powder highly-blended thin film sheet that is low cost, and in particular, relates to a thin film sheet having high whiteness and opacity imparted with suitability to printing and processing.

BACKGROUND ART

Background of Invention

Among mineral sources, limestone has been considered to exist abundantly in nature in a nearly almost inexhaustible supply.

In recent years, products in which calcium carbonate, which is a powder of this limestone, is highly blended and then molding into a paper-like thin film sheet have been proposed as ecological paper (refer to Patent Document 1), and are being offered for practical use.

Example of Conventional Technology

A production method of ecological paper developed in recent years molds pellets prepared by mixing 56 to 80% by weight of calcium carbonate powder, 43 to 18% by weight of polyethylene resin and 1 to 2% by weight auxiliary agents with an inflation-type extrusion molding machine to make a paper-like thin film sheet (refer to Patent Document 1).

The thin film sheet produced by the above-mentioned technology has been marketed as a commercial product; however, it is limited to partial use due to the following such problem in quality. This commercial product has shortcomings such as powder of the starting material such as calcium carbonate separating or lightly adhering to the sheet surface existing in significant amounts as impurities, and due to being molded with an inflation-type extrusion molding machine, the thickness not being uniform, and at least the commercial products shipped to market having an apparent specific gravity on the order of 1.3 and being one variety, which makes them avoided do to an appearance of looking heavy.

Among the above shortcomings, the impurities become a hindrance in the printing operation due to adhering or causing damage to the blanket, which fulfills an important role in the transfer of ink in the printing process. In addition, the matter of the thickness being non-uniform, in addition to causing the printing quality to decline by making the transfer of printing ink non-uniform, if there are irregularities in the thickness, wrinkles or slack will occur by winding the original sheet, which makes it almost impossible to use in the field of manufacturing.

As a method to solve these shortcomings, for rolled manufactured goods of a thin film sheet, a paper dust eliminating device is used, and for flat paper manufactured goods of a thin film sheet, it is possible to remove for the most part sheets having a lot of impurities in the operation of quality inspection by hand; however, it becomes a drastic cost increase.

Regarding the thickness of these manufactured goods being non-uniform, in the inflation-type extrusion molding machine of the production process, although it cannot be helped but to decrease the unevenness in the thickness of the finished product by performing rotation with the circumferential part of a circular die, temperature regulation, etc., there have been problems for these measures as well in that the equipment cost increases remarkably, and further the productivity declines, and thus it is difficult to adopt in the case of goods of a thin film sheet for which the added value is relatively small.

In order to compensate for the above-mentioned conventional technology, a proposal strongly arguing the effects of two-axis drawing has been made based on quantifying the conditions upon causing a hollow film tube extruded from a circular die of an inflation-type extrusion molding machine to swell especially as 3 to 8 times, and a force pulling the sheet upwards also acting (refer to Patent Document 2). However, there being a function in two-axis drawing in inflation molding is well known, and there is not considered to be a particular change in the machinery, compared to the conventional technology described in Patent Document 1.

Furthermore, since actually stabilizing manufacture by including detailed drawing conditions with an inflation-type extrusion molding machine is not easy, the problems thus far with the newly proposed technology are mostly unsolved.

Other Example of Prior Art

Entirely different from the above, a multilayer structure film has been proposed in which a top surface or top and back surfaces are adhered by adhering a film having a surface roughness of 0.3 to 1.5 μm, made by a film in which an olefinic polymer containing 5 to 40% by weight inorganic fine powder is drawn in the longitudinal direction being established as a base layer, laminating in a sheet form the product of melting and kneading a propylene-based copolymer or high-density polyethylene containing 8 to 65% by weight of an inorganic fine powder onto at least one side of this base layer, and then drawing in the horizontal direction using a tenter. However, the synthetic paper that is this proposed multilayer structure film has a great number of long cracks in the surface, and thus inorganic fine powder tends to drop out, which has become a hindrance in the printing process. Therefore, it has been proposed to add a means for coating the surface of the inorganic fine powder existing in the sheet attached to the top surface layer or the top and back surface layers with a propylene-based copolymer or high-density polyethylene. The above technology is being implemented, and manufactured products thereof are widely used as synthetic paper in Japan.

However, in the above-mentioned production method of a multilayer structure film, it is necessary to draw 4 to 7 times in the longitudinal direction and 4 to 12 times in the horizontal direction, and it is noted in the examples as being 5 times in the longitudinal direction and 7.5 times in the horizontal direction (refer to Patent Document 3). When the draw ratio is large in this way, bad influences on paper quality appear such as long cracks appearing in the surface, which is the cause for requiring an operation to cover the inorganic fine powder surface of the top surface layer or top and back surface layers with a film material.

Furthermore, the synthetic paper that is this proposed multilayer structure film is not characteristic of a paper considered inexpensive since it has a complicated production process and special resins are used, for example, and thus the cost is high compared to general paper produced from wood pulp, as is evident in view of the production method.

[Patent Document 1] Japanese Unexamined Patent Application, Publication No. H11-277623
[Patent Document 2] Japanese Unexamined Patent Application, Publication No. 2011-031623
[Patent Document 3] Japanese Unexamined Patent Application, Publication No. H7-314622

DISCLOSURE OF THE INVENTION

Problems to be Solved by the Invention

The problem to be solved by the present invention is to provide a method for producing a thin film sheet, that is able to improve, to an extent satisfying every customer, the manufacturing property upon using in printing and other processing fields, and the quality of printed matter and finished goods obtained, in the preparation of a thin film sheet of high whiteness and high opacity, by highly blending an inorganic substance powder.

More specifically, the impurity occurrence prevention, preparation of sheets of uniform thickness, control of product apparent specific gravity as well as use of general-purpose resins, and suppression of product cost by an increase in productivity are problems.

Means for Solving the Problems

The present invention provides the following means for solving the above-mentioned problems. For the matter of impurities, a range of particle sizes is selected for the inorganic substance powder, which is a cause for occurrence; the matters of improvements in precision in sheet thickness and productivity, a T die-type extrusion molding machine is selected that has an established reputation of being the best for both, for the matter of the apparent specific gravity of the sheet, a drawing machine is employed, and according to the selection of a predetermined suitable management method of drawing conditions and the thermoplastic resin, and according to the selection of inorganic substance powder for the surface property, a calendar is also employed as necessary. Solving by using inorganic substance powder that is free of particles of large particle size, forming a sheet with a T die-type extrusion molding machine, processing at predetermined longitudinal/horizontal draw ratios, etc. is established as the most important characteristic, and curbing the cost increase by the use of a general-purpose resin as well as the equipment aspect scheme for these solutions are also included in the means for solving.

Among the above-mentioned problems, regarding impurities, even if the nip pressure between the rolls through which the thin film sheet passes were applied in the manufacturing process of the conventional technology, inorganic substance powder protruding to the sheet surface would still be a problem, and the maximum particle size of the inorganic substance powder used was defined as 50 μm in order to solve this problem. In addition, also for the average particle size of the inorganic substance powder used, the range thereof was defined based on reasons noted later.

A means for solving the problem of the present invention is a method for producing an inorganic substance powder highly-blended thin film sheet that kneads inorganic substance powder, thermoplastic resin and an auxiliary agent at predetermined blending rates, molds and then draws to finish into a thin film sheet, the method including:

a step of preparing the inorganic substance powder, the thermoplastic resin and the auxiliary agent, wherein the inorganic substance powder has an average particle size of 0.5 to 15 μm and is free of particles with a particle size of 50 μm or larger;

step of molding an inorganic substance powder highly-blended thin film sheet intermediate body by kneading at blending rates of 60% by weight to 82% weight of the inorganic substance powder, 18% by weight to 40% by weight of the thermoplastic resin and 0.05% by weight to 4.0% by weight of the auxiliary agent as starting materials by charging into an extrusion molding machine equipped with twin screws, and causing high shearing stress to act on the starting materials, and then extrusion molding by way of a T die system by pushing the starting materials thus kneaded through a die; and a step of performing longitudinal drawing and/or horizontal drawing so that the thin film sheet after drawing has a desired apparent specific gravity, by controlling drawing ratios in the longitudinal direction and horizontal direction both to 1.1 times to 3.0 times, in which the thermoplastic resin is selected so as to be able to cause the apparent specific gravity of the inorganic substance powder highly-blended thin film sheet to decrease to 0.55 to 1.40 when establishing drawing ratios of 1.1 times to 3.0 times, and the desired apparent specific gravity is adjusted to the range of 0.55 to 1.40 to be white and opaque by selecting the thermoplastic resin in the above-mentioned way in the step of performing drawing.

The thermoplastic resin improves the flowability of the kneaded melt in which the inorganic substance powder is highly blended.

The kneaded melt of thermoplastic resin in which inorganic substance powder is highly blended has high viscosity and poor flowability, and it has been said to be difficult to practically blend 40% by weight or more of inorganic substance powder and molding into a sheet with a T die system.

In order to solve this situation, the present inventors first noticed from a mechanical aspect that causing high shear stress to act thereon and knead with a twin screws is effective.

Furthermore, the kneaded melt of thermoplastic resin in which inorganic substance powder is highly blended is understood to tend to partially agglomerate, and thus it is necessary to cause the agglomerated portion to re-disperse inside the die, and it is considered sufficient to provide a small barrier in the flow path inside the die in order to do so.

In the case of the flowability still not being sufficient despite coping in the above way, the melt sheet leaving from the die outlet is made to contact as soon as possible with a roll heated to a temperature of at least 50° C. and no higher than the melting point of the resin used in the starting materials, and after forming a sheet on the roll, feeding to a roll train process.

In order to solve the situation of high viscosity and poor flowability, from a starting material aspect, the selection of the thermoplastic resin is also important. However, in the case of the extrusion molded sheet being drawn in a subsequent process, for the starting materials of inorganic substance powder high blending, there are those that do not draw easily due to the thermoplastic resin.

For this reason, when the draw ratio is 1.1 times to 3.0 times in the drawing process, a resin such that it is possible to cause the apparent specific gravity of the inorganic substance powder highly blended thin film sheet to decline to the range of 0.55 to 1.40 is first selected as a drawing adaptive resin corresponding to the inorganic substance powder. Next, in the case that a flowability improvement is necessary with only this resin, a thermoplastic substance having an effect of improving the flowability decline of the kneaded melt due to the inorganic substance powder high blending is searched, and this resin is selected as a kneading adaptive resin corresponding to the inorganic substance powder. Moreover, when using a drawing adaptive resin or combining a drawing adaptive resin and kneading adaptive resin, it becomes possible to efficiently mold a thin film sheet intermediate body stably.

In the case of inorganic substance powder high blending, the selection of a drawing adaptive resin corresponding to the inorganic substance powder becomes important.

For evaluation, the thermoplastic resin is kneaded into the inorganic substance powder at a concentration that makes kneading relatively easy, e.g., resin amount of 55% by weight to 65% by weight of the overall weight, then made into a sheet with a T die-type extrusion molding machine, and the drawability of this sheet is evaluated. For the drawability evaluation, tensile testing is performed according to the method of JIS K7127:1999, and evaluating at the stretch (%) measured at the temperature at which the highest stretch (%) is measured is considered a suitable method. It should be noted that, in the case of the stretch (%) being 10, for example, in this measurement, the draw ratio will be 1.1 times.

Another means for solving the problem of the present invention is a method for producing an inorganic substance powder highly-blended thin film sheet, in which the step of molding the inorganic substance powder highly-blended thin film sheet intermediate body consists of two independent steps including a step of making pellets consisting of the inorganic substance powder, the thermoplastic resin and the auxiliary agent, and a step of extrusion molding the pellets with a single- or twin-screw T die-type extrusion molding machine.

Another means for solving the problem of the present invention is a method for producing an inorganic substance powder highly-blended thin film sheet that kneads an inorganic substance powder, thermoplastic resin, and auxiliary agent at a predetermined blending rates, molds with an extrusion molding machine, and draws to finish into a thin film sheet consisting of three or two layers of a skin layer consisting of a top layer and/or back layer, and a core layer, the method comprising:

a step of preparing skin layer starting materials containing the inorganic substance powder, the thermoplastic resin and the auxiliary agent for the skin layer, in which the inorganic substance powder for the skin layer has an average particle size of 0.5 to 4 μm, and is free of particles with a particle size of 50 μm or larger;

a step of preparing core layer starting materials containing the inorganic substance particles, the thermoplastic resin and the auxiliary agent for the core layer;

in which the inorganic substance powder for the core layer has an average particle size of 4 to 15 μm and is free of particles with a particle size of 50 μm or larger;

a step of kneading the skin layer starting materials at the below predetermined blending rates;

a step of kneading the core layer starting materials at the below predetermined blending rates, in which the blending rates of the inorganic substance powder for the skin layer and for the core layer are 60% by weight to 82% by weight, the blending rates of the thermoplastic resin for the skin layer and for the core layer are 18% by weight to 40% by weight, and the blending rates of the auxiliary agent for the skin layer and for the core layer are 0.05% by weight to 4.0% by weight;

a step of molding a thin film sheet intermediate body with a two-type three-layer T die-type extrusion molding machine, by dividing amounts supplied of the skin layer starting materials thus kneaded and the core layer starting materials thus kneaded so that top and back two layers of the skin layer respectively become 10 to 30 parts, and the core layer becomes 40 to 80 parts; and a step of adjusting to an apparent specific gravity at which the external appearance is similar to paper, is opaque, and printing and processability are superior, and which a client demands, by performing sequential drawing or simultaneous two-axis drawing on the thin film sheet intermediate body, in which the thermoplastic resins for the skin layer and for the core layer are resins capable of causing the apparent specific gravity of the thin film sheet to decline to 0.6 to 0.8 at draw ratios of 1.1 times to 3.0 times in both longitudinal and horizontal directions during drawing.

Another means for solving the problem of the present invention is a method for producing an inorganic substance powder highly-blended thin film sheet, in which the die in the step of molding the inorganic substance powder highly-blended thin film sheet intermediate body is a die designed so as to re-disperse reagglomerated portions of the starting materials kneaded.

Another means for solving the problem of the present invention is a method for producing an inorganic substance powder highly-blended thin film sheet in which, in the step of molding the inorganic substance powder highly-blended thin film sheet intermediate body, a melt sheet leaving from a die outlet is made to contact as soon as possible with a roll heated to a temperature of at least 50° C. and no higher than the melting point of the thermoplastic resin used in the starting materials, and after forming a sheet on the roll, is sent to a roll train step. In this case, it is a useful means from efficiency, etc. aspects.

Another means for solving the problem of the present invention is a method for producing an inorganic substance powder highly-blended thin film sheet, in which a thin film sheet is efficiently and stably formed, by performing a tensile test according to the method of JIS K7127:1999 at a temperature at which maximum stretch (%) is obtained on a thin film sheet intermediate body obtained by blending any thermoplastic resin into the inorganic substance powder at a blending rate that comparatively facilitates kneading, then kneading and molding; estimating a draw ratio that ratio that enables drawing from a numerical value of stretch (%) and if an expected thermoplastic resin, selecting the thermoplastic resin as a drawing adaptive resin for the inorganic substance powder; in a case of requiring a further improvement in flowability of a kneaded melt by only the thermoplastic resin, using a thermoplastic resin that has an improving effect on flowability decline of the kneaded melt due to organic substance powder high blending in combination in the range of 0 to 50% by weight relative to total weight of thermoplastic resins blended.

Another means for solving the problem of the present invention is a method for producing an inorganic substance powder highly-blended thin film sheet, in which the draw ratio is 1.1 times to 2.5 times for both draw ratios in the longitudinal direction and horizontal direction. In this case, it is preferable to be in the range of 1.1 times to 2.5 times from the viewpoint of adjustment of the apparent specific gravity.

Another means for solving the problem of the present invention is a method for producing an inorganic substance powder highly-blended thin film sheet, in which the desired apparent specific gravity is in the range of 0.55 to 1.25. Since precise apparent specific gravity adjustment is performed by longitudinal and/or horizontal drawing, effects are exerted in the case of making a product having an apparent specific gravity in the above-mentioned range, for which particularly fine adjustment is demanded.

Another means for solving the problem of the present invention is a method for producing an inorganic substance powder highly-blended thin film sheet, in which the thermoplastic resin is at least one type of resin selected from the group consisting of polyethylene, polypropylene, polystyrene and polyethylene terephthalate.

Another means for solving the problem of the present invention is a method for producing an inorganic substance powder highly-blended thin film sheet, in which the thermoplastic resin is a polyethylene resin in which at least 60% by weight of the polyethylene resin is a high-density polyethylene resin having a melt mass-flow rate of 0.02 to 1.2 g/10 min.

Another means for solving the problem of the present invention is a method for producing an inorganic substance powder highly-blended thin film sheet, in which the thermoplastic resin consists of high-density polyethylene resin, and 50% by weight to 100% by weight of the high-density polyethylene resin has a melt mass-flow rate of 0.02 to 0.5 g/10 min, and the remainder of the high-density polyethylene resin has a melt mass-flow rate of 0.5 to 1.2 g/10 min.

Another means for solving the problem of the present invention is a method for producing an inorganic substance powder highly-blended thin film sheet, in which the inorganic substance powder is at least one type of inorganic substance powder selected from the group consisting of calcium carbonate, clay, silica, titanium oxide, talc, kaolin and aluminum hydroxide.

Another means for solving the problem of the present invention is a method for producing an inorganic substance powder highly-blended thin film sheet, in which calendar processing is performed on the inorganic substance powder highly-blended thin film sheet in order to improve smoothness.

Another means for solving the problem of the present invention is a method for producing an inorganic substance powder highly-blended thin film sheet, in which the draw ratio is obtained in the step of performing drawing according to the following formula from the apparent specific gravity (D) and aspect ratio (R) required after the drawing, $$X2=W\times 10-4/(D\times Z\times R\times T)$$

$$X=R\times Y$$

in which D is the apparent specific gravity of a product established in production planning, R is an aspect ratio (ratio of draw ratios in longitudinal direction and horizontal direction) established in production planning, W is the weight per one square meter (g/m2) of a thin film sheet prior to subjecting to longitudinal drawing, X is the draw ratio in the longitudinal direction, Y is the draw ratio in the horizontal direction, and Z is the contraction ratio or extension ratio of the length in the horizontal direction of the sheet due to longitudinal drawing, and is easily estimable by operational experience of the present equipment.

Effects of the Invention

According to the method for producing of the present invention, it is possible to highly blend an inorganic substance powder to prepare a thin film sheet with little thickness unevenness having superior printability and processability (both workability, along with quality), and a favorable surface state with high whiteness and opacity, at an apparent specific gravity of some standards similar to paper, which is demanded by clients; more specifically, there is no negative influence on damage of the blanket during printing, for example, and thus efficient operation is possible in the fields of printing and processing, and it is possible to produce a thin film sheet that can produce high quality printed matter and processed goods, a result of which it can be expected that the demand for these goods will rise in industry and society, and ecological sheets of inorganic substance high blending that can be produced with little energy without using wood and water will become popular.

PREFERRED MODE FOR CARRYING OUT THE INVENTION

Figure 1:
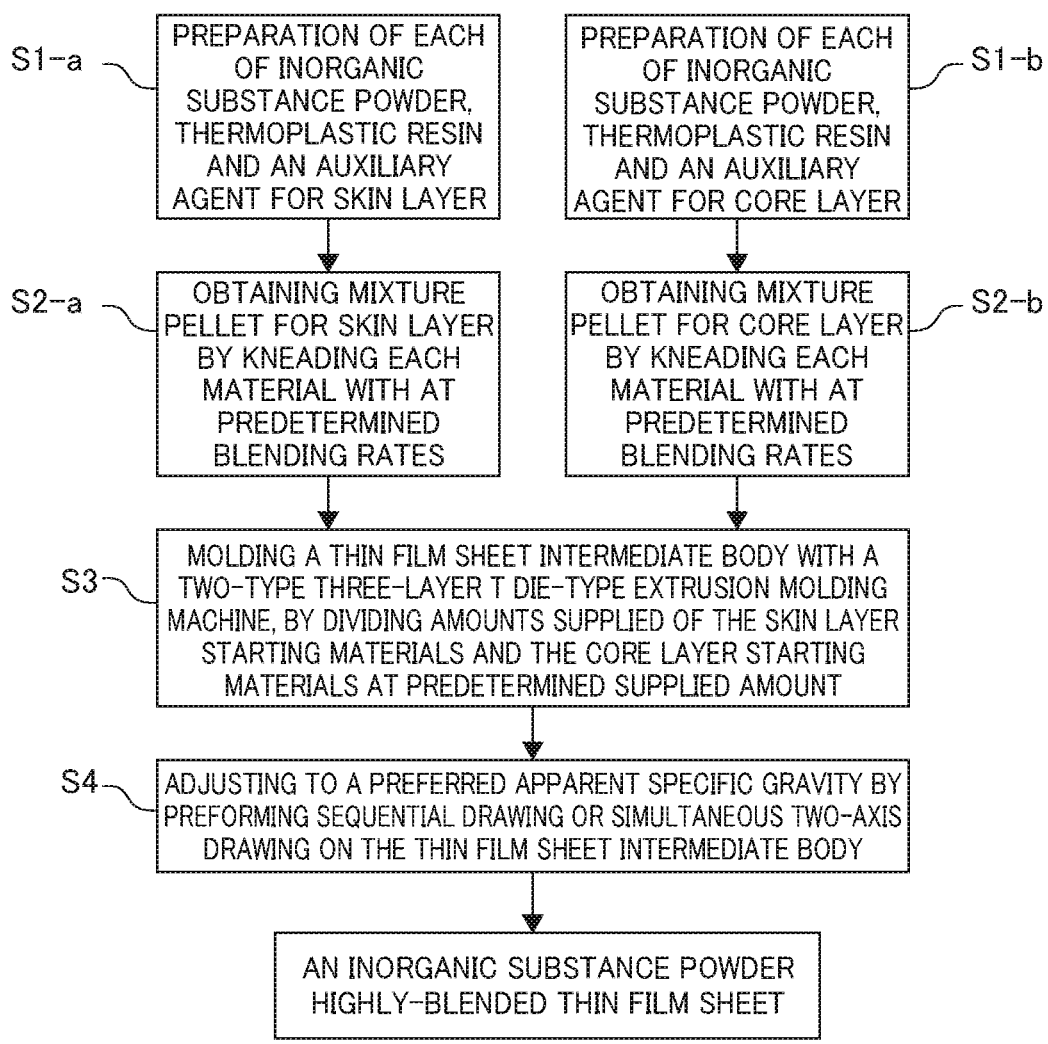
FIG. 1 shows an outline of the steps of the production method of the present invention.
Figure 2:
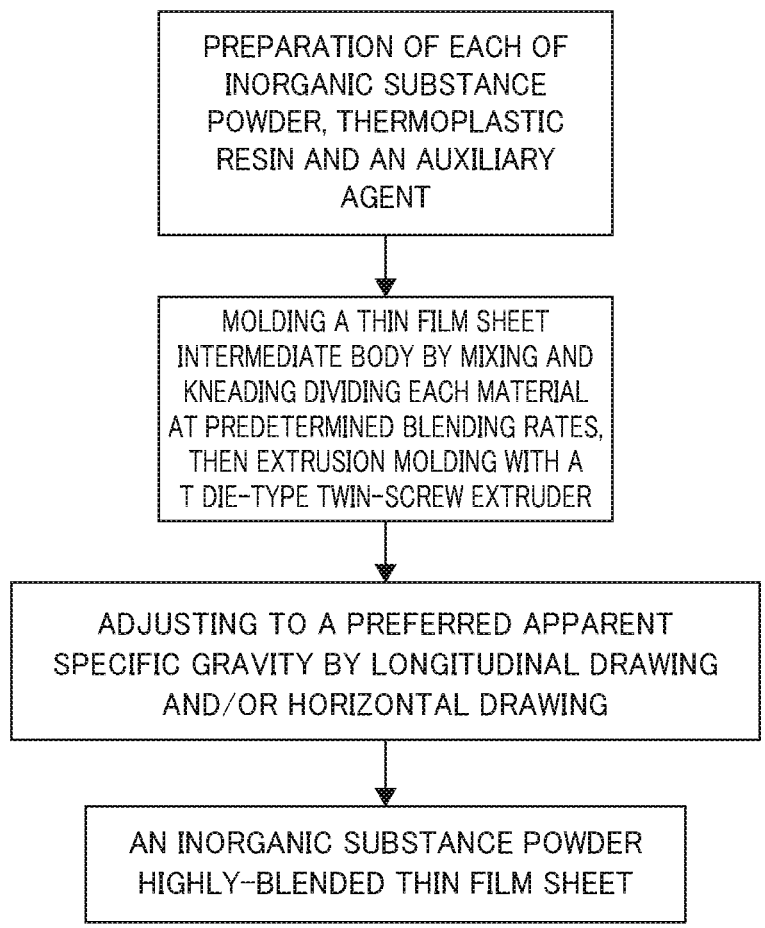
FIG. 2 shows an outline of the steps of another production method of the present invention.
Figure 3:
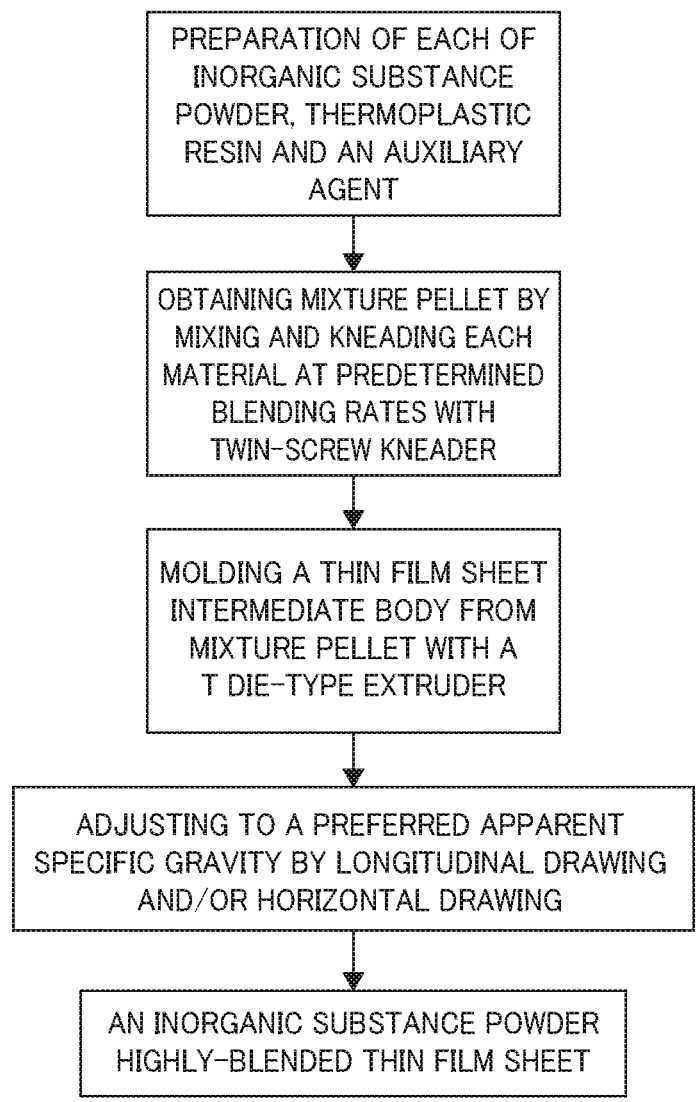
FIG. 3 shows an outline of the steps of yet another production method of the present invention.

The problems to be solved by the present invention are the prevention of impurity generation, preparation of a sheet having uniform thickness, use of an all-purpose resin as well as control of apparent specific gravity in the finished product, and the curbing of production costs by a productivity improvement.

Among the above-mentioned problems, a T die-type extrusion molding device has been considered the most suitable for uniformity in thickness and an improvement in productivity, and thus this system has been adopted.

However, with T die-type extrusion molding devices, the blending rate of inorganic substance powder being carried out industrially has been on the order of 40% in most cases.

Therefore, the inventors have conducted moldings tests using a commercially available compound for master batch made at a ratio of 20 parts polyethylene resin to 80 parts calcium carbonate with each of an inflation-type and T die-type common extrusion molding machine. Although tested by adding high-density polyethylene resin to gradually decrease the blending ratio of calcium carbonate, a tentative thin film resin could be prepared with the inflation type at approximately 70% by weight, but a thin film sheet could not be prepared with the T die-type extrusion molding machine.

The object of the present invention is premised on the production of a thin film sheet having high whiteness and opacity, and the condition of inorganic substance powder high blending is essential. However, in the case of extrusion molding mixed starting materials of inorganic substance powder and thermoplastic resin with a T die-type extrusion molding machine, if the concentration of the inorganic substance powder exceeds 60% by weight, the viscosity upon melting will increase extremely accompanying a concentration rise.

The inventors have carried out research to make a thin film sheet with a T die-type extrusion molding machine by highly blending at least 60% inorganic substance powder into thermoplastic resin, and found the following such production method for solving the problems of the present invention.

An inorganic substance powder highly blended thin film sheet intermediate body is molded by kneading the mixed starting materials of the inorganic substance powder and thermoplastic resin, and then extrusion molding with a T die-type extrusion molding machine.

Thereupon, as a first operation, the thermoplastic resin and inorganic substance powder are mixed, a particularly great shear stress is made to act thereon to knead at a temperature of at least the melting point of the thermoplastic resin, thereby causing the inorganic substance powder and thermoplastic resin to disperse uniformly. In this case, a twin-screw extruder should be used to cause a great shear stress to act thereon.

Next, as a second operation, it is extruded from the die outlet while maintaining the uniformly dispersed state to mold a thin film sheet; however, in the case of mixed starting materials in which the inorganic substance powder is highly blended, the mixed starting materials in a melted state leaving the screw section of the extrusion molding machine tend to agglomerate; therefore, it is necessary to re-disperse to homogenize by providing a barrier at a portion of the flow of the mixed starting materials inside of the die, or the like.

As a means for applying an external force to the flow of mixed starting materials in the die, means are included such as operating a choke bar employed in extrusion molding of sheets with a thickness of at least 200 to 250 μm to make the sheet extruded from the lip uniform. By devising the layout depending on the magnitude of the external force required to re-disperse, the above measure further enables a sufficient effect to be exhibited.

In addition, since the molten thin film sheet extruded from the die outlet (lip) breaks very easily in the case of being near the melting point of the thermoplastic resin, depending on the case, it is necessary to cool by contacting with a cooling roll as soon as possible, and molding while holding to this roll as is. For this purpose, a change on the facility side suited to the extrusion molding machine is also necessary, such as making the cooling roll moveable vertically.

Although the required conditions for kneading and extrusion molding have been decided above from the machine side, in conclusion, the inventors considered the use of a twin-screw kneader capable of causing a strong shearing stress to act by way of twin screws to be indispensable in the kneading of a starting material of inorganic substance high blending.

Furthermore, since the starting materials of the inorganic substance high blending tend to assume re-agglomeration behavior also during melting, a direct method using a T die-type twin-screw extrusion molding machine that sequentially conducts kneading and extrusion molding is considered suited.

Summarizing the above, the production of an inorganic substance powder highly-blended thin film sheet assumes a production method of kneading the inorganic substance powder, thermoplastic resin, and auxiliary agents with a device equipped with twin screws in the blending rates of 60% by weight to 82% by weight, 18% by weight to 40% by weight, and 0.05% by weight to 4.0% by weight, respectively, then extrusion molding with the T die-type extrusion molding machine to mold a thin film sheet intermediate body, and as the facility, it is concluded that a twin-screw extrusion molding machine that sequentially conducts kneading and extrusion molding is desirable as equipment.

Herein, in the case of using a starting material of inorganic substance powder high blending and making a finished product by drawing a molded sheet, the selection of the thermoplastic resin used is very important.

For the thermoplastic resin, the inventors found that a resin that is easily drawn such that the apparent specific gravity of a sheet remarkably decreases compared to the thickness of the sheet as a result is more suitable due to making the sheet structure after drawing as uniform as possible.

As a result of reviewing with the above-mentioned way of thinking, it was established that a thermoplastic resin must be used that can cause the apparent specific gravity of the inorganic substance powder highly-blended sheet to decline to 0.5 to 1.40, when drawing at a draw ratio of 1.1 times to 3.0 times.

Upon reviewing this condition, it became evident that, with starting materials in which the inorganic substance powder was highly blended, drawing became difficult, and the thermoplastic resin that facilitates drawing and a thermoplastic resin that acts in a trend lowering the viscosity of the kneaded melt are not necessarily consistent.

The method of selecting the thermoplastic resin first selects a resin capable of causing the apparent specific gravity of the inorganic substance powder highly-blended thin film sheet to decrease to the range of 0.55 to 1.40 at a draw ratio of 1.1 times to 3.0 times as the drawing adaptive resin corresponding to the inorganic substance powder. Next, in the case of the flowability of the melt kneaded product of the mixed starting material being poor with only this resin, the method searches for a thermoplastic resin having an improvement effect on the flowability decline due to the inorganic substance powder high blending, and selects this resin as a kneading adaptive resin corresponding to this inorganic substance powder. It is decided to use only a drawing adaptive resin, or to use by combining the kneading adaptive resin in the range of 0 to 50% by weight relative to the total amount of thermoplastic resin, into the drawing adaptive resin.

To search for a drawing adaptive resin, for a sheet obtained by blending a thermoplastic resin that is a candidate at the blending ratio at which kneading with the inorganic substance powder is comparatively easy, and then kneading and extrusion molding, a tensile test is conducted according to the method of JIS K7127:1999 at the temperature at which maximum stretch (%) is obtained, and resins for which stretch (%) was at least 15, desirably 50 to unmeasurable (due to the capacity of the measurement equipment) are selected as drawing adaptive resins that correspond to this inorganic substance powder.

On an inorganic substance powder highly-blended thin film sheet intermediate body obtained by kneading the inorganic substance powder, thermoplastic resin and auxiliary agents were kneaded at predetermined blending rates, and extrusion molding, longitudinal drawing or horizontal drawing is performed, or sequentially or simultaneously two-axis drawing is performed, to adjust to an apparent specific gravity desired by the client and at which the appearance resembles paper, is white and opaque, and printing and processing suitability are superior. Herein, the draw ratios in the longitudinal and horizontal directions after drawing are both 1.1 times to 3.0 times, and conditions are adjusted so that the apparent specific gravity of the thin film sheet becomes the desired apparent specify gravity in the range of 0.55 to 1.40.

The step of molding the inorganic substance powder highly-blended thin film sheet intermediate body can be established as a combination of two independent steps consisting of a step of making pellets consisting of the inorganic substance powder, thermoplastic resin and auxiliary agents by conducting only the step of kneading, and a step of extrusion molding these pellets with the T die-type extrusion molding machine.

One aspect of the present invention is a method for producing an inorganic substance powder highly-blended thin film sheet that kneads an inorganic substance powder, thermoplastic resin and auxiliary agent at a predetermined blending rates, molds with an extrusion molding machine, and draws to finish into a thin film sheet consisting of three or two layers of skin layers consisting of a top layer back layer, and a central core layer, in which the inorganic substance powder for the skin layer has an average particle size of 0.5 to 4 μm, and is free of particles with a particle size of 50 μm or larger, and the inorganic substance powder for the core layer has an average particle size of 4 to 15 μm and is free of particles with a particle size of 50 μm or larger, the method including:

a step of kneading the skin layer starting materials at the below predetermined blending rates;

a step of kneading the core layer starting materials at the below predetermined blending rates, in which the blending rates of the inorganic substance powder for the skin layer and for the core layer are 60% by weight to 82% by weight, the blending rates of the thermoplastic resin for the skin layer and for the core layer are 18% by weight to 40% by weight, and the blending rates of the auxiliary agent for the skin layer and for the core layer are 0.05% by weight to 4.0% by weight;

a step of molding a thin film sheet intermediate body with a two-type three-layer T die-type extrusion molding machine, by dividing amounts supplied of the skin layer starting materials thus kneaded and the core layer starting materials thus kneaded so that top and back layers of the skin layer respectively become 10 to 30 parts, and the core layer becomes 40 to 80 parts; and a step of adjusting to an apparent specific gravity at which the external appearance is similar to paper, is opaque, and printing and processability are superior, and which a client demands, by performing sequential drawing or simultaneous two-axis drawing on the thin film sheet intermediate body, in which the thermoplastic resins for the skin layer and for the core layer are resins capable of causing the apparent specific gravity of the thin film sheet to decline to 0.6 to 0.8 at draw ratios of 1.1 times to 3.0 times in both longitudinal and horizontal directions during drawing.

By changing the particle size of the inorganic substance powder of each layer among the top and back layers and the intermediate layer, the method seeks to further enhance the effects of the present invention.

With the production method of the present invention, in the case of a single layer thin film sheet, for the inorganic substance powder, a powder having an average particle size of no more than 15 μm is used in order to raise the smoothness of the sheet surface, and prevent large particles of the inorganic substance powder from breaking off from the sheet. The reason is because the maximum particle size becomes larger as the average particle size increases in the sieving process employed for particle size adjustment.

On the other hand, since the viscosity increases remarkably upon kneading with the thermoplastic resin if the particles are excessively fine, the average particle size is set to be at least 0.5 μm.

In addition, in the case of producing an inorganic substance powder highly-blended thin film sheet consisting of skin layers including a top layer and back layer, and a core layer, for the inorganic substance powder, a powder having high whiteness and small particle size is used in the skin layers of the top layer and the back layer, in order to improve the whiteness and smoothness of the sheet surface. The average particle size of the inorganic substance powder used in the skin layers is no more than 4 μm, and the average particle size is at least 0.5 μm, since the viscosity will rise remarkably upon kneading with the thermoplastic resin if the particles are too fine.

The average particle size of the inorganic substance powder particles included in the intermediate layer, i.e. core layer, is set to 4 to 15 μm, which is somewhat large compared to the case of a single layer, since larger is desired from the point of cost.

It should be noted that, in the present invention, the particle size of the inorganic substance powder is represented by a numerical value measured by a laser diffraction particle size analyzer, and the average particle size indicates the 50% particle size (d50) obtained from the distribution curve of integral %. In addition, the approximate value of the particle size, in a case of the same substance and such that production areas being close, can be calculated as an equivalent value using reliable conversion data even from other measured values such as of the air permeability method, and in the present disclosure, the 50% particle size obtained from the distribution curve of the integral % and the conversion value are used as the particle size.

For the size of the all of the inorganic substance powder, the coexistence of large diameter particles larger than a specific particle size is a problem in the production method of the present invention.

Regarding the target for the surface roughness of the thin film sheet of the present invention, the surface roughness of fine paper made from wood pulp is considered the upper limit. The surface roughness of fine paper has an average value of 8 to 13 μm and a maximum value on the order of 20 μm (Takashi Kadoya, Ichiro Tsunosuke and Isamu Yoshino, Chugai Sangyo Chosakai, "New Paper Science," pp. 400-401 (1989)). Also for the inorganic substance powder near the sheet surface, if a portion of the particles corresponding to ½ of the particle size is calculated as being embedded in the sheet, particles having a particle size of at least 50 μm, desirably at least 45 μm, must be removed from the starting material.

As previously described, in the thin film sheet produced with the conventional technology, impurities exist in a considerable amount; however, the results from analyzing a sample of calcium carbonate powder provided as a starting material thereof by a Microtrac particle size analyzer (manufactured by Nikkiso Co., Ltd.) were as follows. Median particle size (D50%): 8.42 μm, particles with particle size of at least 50 µm: 0.26%, particles of at least 45 µm: 0.34%. On the other hand, the results from measuring calcium carbonate powder treated as a starting material for which the inventors were not concerned about impurities (Microcal #150 manufactured by Yuukou Mining Co.) with the Microtrac particle size analyzer were as follows. Median particle size (D50%): 5.4 µm, particles with particle size of at least 40 µm: 0%. The regulations related to the size of particle size are considered appropriate also from the above-mentioned numerical values.

According to the inventors of the present invention, it is confirmed that the blanket of a printing press has been damaged since particles of maximum diameter of at least 50 µm are included in existing goods of inorganic substance powder highly-blended thin film sheets; therefore, there is an essential requirement in that the inorganic substance powder of the starting material does not contain particles having a particle size of at least 50 µm, and preferably if considering the above-mentioned analysis, particles having a particle size of at least 45 µm.

The blending rate of the inorganic substance powder in the present invention must be at least 60% by weight from the viewpoint of the characteristic exhibition of the sheet according to the blending; however, 82% by weight is the limit looking from the viscosity increase upon kneading with the thermoplastic resin.

As the inorganic substance powder of the present invention, powders of calcium carbonate, titanium oxide, silica, clay, talc, kaolin, aluminum hydroxide, etc. can be used.

For the inorganic substance powder, oil absorptivity is not particularly required, and upon selection, there is no need for a limitation in the aspect of oil absorptivity.

As a thermoplastic resin for the present invention, other than polyethylene, others such as polypropylene, polystyrene and polyethylene terephthalate, as well as recycled resins, etc. can be used.

As ones best matching these conditions, there are polyethylene resins, and thereamong, high-density polyethylene resins are suited from the point of the strength of the inorganic substance powder highly-blended thin film sheet.

The blending rate of the thermoplastic resin is 40% by weight in the case of the blending rate of the inorganic substance powder being 60% by weight, and is 18% by weight in the case of the blending rate of the inorganic substance powder being 82% by weight.

As auxiliary agents, a lubricant, fluidity improving agent, dispersant, antioxidant, UV absorbing agent, stabilizer, etc. may be blended.

The blending rate of auxiliary agents is 0.05% by weight to 4.0% by weight, and preferably 0.1% by weight to 3.0% by weight, based on 100% by weight total amount of thermoplastic resin and calcium carbonate.

The thermoplastic resin, inorganic substance powder and auxiliary agents are kneaded and molded into a sheet.

The thin film sheet intermediate body molded by the T die-type extrusion molding machine is drawn by a longitudinal drawing apparatus employing the circumferential velocity difference of a plurality of rollers, and a sheet-end fixing type tenter. More specifically, sequential drawing is performed using both consecutively, or independently using each, or alternatively two-axis drawing with a simultaneous two-axis drawing apparatus to finish as a thin film sheet.

The draw ratio is preferably 1.1 times to 3.0 times for both the longitudinal direction and horizontal direction, and the processing temperature is preferably no higher than the melting point of the resin used; however, a temperature is assumed at which the maximum stretch (%) for the target thin film sheet by employing the previously mentioned method of JIS K7127:1999 or the like to ensure accuracy.

The required draw ratio can also be calculated by way of calculation. For the sheet molded by the T die-type extrusion molding machine, the weight per 1 square meter (also referred to as basis weight) W (g/m2) of the thin film sheet prior to subjecting to longitudinal drawing is measured, and using the apparent specific gravity D of the product and the aspect ratio (ratio of draw ratios in longitudinal direction and horizontal direction) R established in production planning, and the target value T (cm) for the thickness of the product after horizontal drawing, the draw ratios (longitudinal direction X times, horizontal direction Y times) are decided according to the following formula, and drawing is performed.

$$X2 = W \times 10-4/(D \times Z \times R \times T)$$

$$X = RY$$

In the formula, D: apparent specific gravity of product established in production planning;

R: aspect ratio establish in production planning (ratio of draw ratios in longitudinal direction and horizontal direction);

W: weight per one square meter (g) of thin film sheet prior to subjecting to longitudinal drawing;

X: draw ratio in longitudinal direction;

Y: draw ratio in horizontal direction;

Z: the contraction ratio or extension ratio of the length in the horizontal direction of the sheet due to longitudinal drawing, which can be easily estimated with operation experience of the present equipment.

If drawing is performed at a temperature 30° C. to 40° C. lower than the melting point of the starting material resin, gaps can happen easily. In the case of using high-density polyethylene resin, the drawing temperature is preferably 95° C. to 105° C.

After drawing, the smoothness of the surface of the thin film sheet can be improved by processing the inorganic substance powder highly-blended thin film sheet obtained by drawing with a calendar.

EXAMPLES

Example 1

Each starting material of high-density polyethylene resin (HI-ZEX 550BR, melt mass-flow rate=0.27 g/10 min, manufactured by Prime Polymer Co., Ltd.), calcium carbonate having an average particle size (d50) of 1.6 µm (equivalent) and not containing particles with a particle size of 50 µm or more (Softon 2200, manufactured by Shiraishi Calcium Kaisha, Ltd.), and calcium stearate (manufactured by NOF Corp.) was prepared (Step: S1-a).

Each of the above-mentioned starting materials were kneaded at a screw revolution speed of 500 rpm at 200° C., using a small-scale co-rotation twin-screw kneader (screw diameter=25 mm, L/D=41, manufactured by Parka Corporation), so that 20% by weight of high-density polyethylene resin, 80% by weight of calcium carbonate, and 1% by weight of calcium stearate (based on total amount of high-density polyethylene resin and calcium carbonate: 100%) were blended, to prepare mixed pellets (compound) A (Step: S2-a).

Each starting material of high-density polyethylene resin (HI-ZEX 550BR, melt mass-flow rate=0.27 g/10 min, manufactured by Prime Polymer Co., Ltd.), calcium carbonate having an average particle size (d50) of 5.4 μm (equivalent) and not containing particles with a particle size of 50 μm or more (Microcal #150 manufactured by Yuukou Mining Co.), and calcium stearate (manufactured by NOF Corp.) was prepared (Step: S1-b).

Each of the above-mentioned starting materials were kneaded in the same way as described above so that 20% by weight of high-density polyethylene resin, 80% by weight of calcium carbonate, and 1% by weight of calcium stearate (based on total amount of high-density polyethylene resin and calcium carbonate: 100%) were blended, to prepare mixed pellets (compound) B (Step: S2-b).

Using the mixed pellets A in the skin layer and the mixed pellets B in the core layer, molding was conducted with a small-scale T die-type two-type three-layer extrusion molding machine (extrusion molding machine: core layer screw diameter=30 mm, L/D=38, skin layer screw diameter=25 mm, L/D=25, die: choke bar equipped, outlet width=300 mm, lip outlet width=500 μm, manufactured by Souken) to obtain a thin film sheet intermediate body (Step: S3).

The sample of the molded thin film sheet intermediate body was drawn at conditions of 96° C., preheating for 5 min, and draw rates both longitudinally and horizontally of 50 mm/min, with a two-axis simultaneous drawing test machine (Toyo Seiki Seisaku-Sho, Ltd. (Model EX10B1, center stretch type) (Step: S4).

As a result, the apparent specific gravity became 0.6 in the sample of the thin film sheet drawn 2.5 times vertically and horizontally, respectively, the sample of the thin film sheet after drawing also increased in opacity, and was similar to paper prepared from wood pulp, along with appearance and common paper quality.

It should be noted that, in the above-mentioned step: S3, the resin pressure increases, and thus sheet formation is not easy; however, by dry blending high-density polyethylene resin (HI-ZEX 7000F, melt mass-flow rate=0.04 g/10 min, manufactured by Prime Polymer Co., Ltd.) to establish a 73% calcium carbonate blend amount in the core layer and 70% in the skin layer, it became easy to obtain a thin film sheet intermediate body.

Example 2

Each starting material of high-density polyethylene resin (HI-ZEX 550BR, melt mass-flow rate=0.27 g/10 min, manufactured by Prime Polymer Co., Ltd.), calcium carbonate having an average particle size (d50) of 5.4 μm and not containing particles with a particle size of 18.5 μm or more (Microcal #150 manufactured by Yuukou Mining Co.), and calcium stearate (manufactured by NOF Corp.) was prepared.

Each of the above-mentioned starting materials was charged into a small-scale co-rotation-type twin-screw extrusion molding machine (screw diameter=25 mm, L/D=30, outlet width of die=150, mm manufactured by Toyo Seiki Manufacturing Co.) so as to make a blend of 28% by weight of high-density polyethylene resin, 72% by weight of calcium carbonate and 1% by weight of calcium stearate (based on total amount of high-density polyethylene resin and calcium carbonate: carbonate: 100%), and kneading and extrusion molding were conducted at conditions of temperature: kneading section 220° C. to 200° C., die section 180° C., screw revolution speed: 24 rpm, torque: approximately 200 N-m, opening width of lip: 0.4 mm. At this time, a sheet of melt leaving from the lip of the die was collected on a cold roll (setting temperature to 65° C.) made to approach within 10 mm from the lip, and by transferring to a subsequent roll after forming into a sheet while making contact and being held to this roll, sheet formation of a thin film sheet intermediate body became possible. The thickness of the thin film sheet intermediate body molded with the extrusion output of about 1.4 kg/hr was 120 μm.

Herein, in order to see the drawing adaptability of the polyethylene resin used, the tensile test was performed at 95° C. with the method of JISK7127 for the above-mentioned thin film sheet intermediate body, and the stretch (%) was measured, a result of which it was at least 360%, and thus it was determined that the above-mentioned high-density polyethylene resin was a drawing adaptive resin.

Therefore, the sample of the molded thin film sheet intermediate body was drawn under conditions of 97° C., preheating for 5 min, and a drawing rate of 50 mm/min with a two-axis drawing test machine (Toyo Seiki Seisaku-Sho, Ltd. (Model EX10B1, center stretch type). As a result, a sample of a thin film sheet drawn 2.1 times longitudinally and horizontally respectively was obtained, and the apparent specific gravity thereof became 0.65.

The whiteness of the thin film sheet before and after drawing (according to the method of JIS P8148) was 38% before drawing and 86% after drawing, and the opacity (according to the method of JIS P8149) was 95.9% before drawing and 100.0% after drawing, and thus both the whiteness and opacity improved by drawing, and were similar to paper prepared from wood pulp, along with appearance and common paper quality.

Example 3

Each starting material of high-density polyethylene resin (Novatec HD HY430, melt mass-flow rate=0.8 g/10 min, manufactured by Japan Polyethylene Corp.), calcium carbonate having an average particle size (d50) of 4.3 μm (equivalent) and not containing particles with a particle size of 20.2 μm or more (Microcal #150 manufactured by Yuukou Mining Co.), and magnesium stearate (manufactured by NOF Corp.) was prepared.

Each of the above-mentioned starting materials was charged into the small-scale co-rotation twin-screw kneader used in Example 1 (manufactured by Parka Corporation), so as to make a blend of 20% by weight of high-density polyethylene resin, 80% by weight of calcium carbonate, and 1% by weight of magnesium stearate (based on total amount of polyethylene resin and calcium carbonate: 100%), and was kneaded at conditions of temperature: other than setting only inlet vicinity to 190° C., 200° C. until reaching the die, screw revolution speed: 500 rpm, feed amount: 7 kg/hr. The torque during kneading was 26 to 31 N-m, and could be pelletized almost stably.

The mixed pellets of polyethylene resin and calcium carbonate obtained above were charged into a single-screw extrusion molding machine (extrusion molding machine: screw diameter=20 mm, L/D=25, die: choke bar equipped, outlet width: 150 mm, manufactured by Toyo Seiki Seisaku-Sho, Ltd.), and kneading and extrusion molding were conducted at conditions of temperature: temperature decreased gradually from 170° C. at pellet feed section and set to 160° C. at die section, screw revolution speed: 10 rpm, opening width of lip: 0.2 mm. The equipment load was stable, and in addition to adjustment of the lip gap at the die, the distribution of the melt was made uniform by a regulating valve provided at the die, and the sheet of melt leaving from the die was made into a sheet at the same conditions as Example 2.

The molded sheet was 190 μm thick, the sheet state was favorable, the tensile test was conducted at 95° C. according to the method of JIS K7127, and the result of measuring the stretch (%) was 52%, which corresponds to a draw ratio on the order of 1.5 times.

Example 4

Each starting material of the product of mixing in a 50:50 ratio a high-density polyethylene resin having a melt mass-flow rate of 0.27 g/10 min (HI-ZEX 550BR manufactured by Prime Polymer Co., Ltd.) and a high-density polyethylene resin having a melt mass-flow rate of 0.8 g/10 min (Novatec HD HY430, manufactured by Japan Polyethylene Corp.), calcium carbonate having an average particle size (d50) of 8 μm (equivalent) and not containing particles with a particle size of 45 μm or more (BF100, manufactured by Bihoku Funka Kogyo Co., Ltd.), and magnesium stearate (manufactured by NOF Corp.) was prepared.

Each of the above-mentioned starting materials was charged into a co-rotation-type twin-screw extrusion molding machine (screw diameter=57 mm, L/D=44, die: choke bar equipped, outlet width 800 mm, manufactured by Hitachi Zosen Corp., Model HTM) so as to make a blend of 27% by weight of high-density polyethylene resin, 73% by weight of calcium carbonate (molded sheet confirmed by measurement according to JIS P8251-525° C. burning method) and 1% by weight magnesium stearate (based on total amount of high-density polyethylene resin and calcium carbonate: 100%), and kneading and extrusion molding were conducted at conditions of temperature: kneading section 220° C. to 200° C., die section 190° C., screw revolution speed: 270 rpm, opening width of lip: 0.6 mm. As a result, the thin film sheet intermediate body with the thickness of 350 μm could be prepared.

In order to investigate the drawing property of the molded sheet, the tensile test was conducted at 95° C. by the method of JISK7127, and as a result of measuring the stretch (%), it was 170%, which was determined as being sufficiently drawable.

A sample of the thin film sheet intermediate body molded as described above was drawn at conditions of 96° C., preheating for 3 min, and draw rates both longitudinally and horizontally of 50 mm/min, with a two-axis simultaneous drawing test machine (Toyo Seiki Seisaku-Sho, Ltd.). The apparent specific gravity was 0.82 in the sample of the thin film sheet stretched 1.6 times longitudinally and horizontally, respectively, the whiteness of the thin film sheet before and after drawing (according to the method of JIS P8148) was 54% before drawing and 78% after drawing, and the opacity (according to the method of JIS P8149) was 97% before drawing and 100.0% after drawing, and thus both the whiteness and opacity improved by drawing, and were similar to paper prepared from wood pulp, along with appearance and common paper quality.

Example 5

Each starting material of a high-density polyethylene resin (HI-ZEX 550BR, melt mass-flow rate=0.27 g/10 min manufactured by Prime Polymer Co., Ltd.), calcium carbonate having an average particle size (d50) of 8 μm (equivalent) and not containing particles with a particle size of 45 μm or more (BF100, manufactured by Bihoku Funka Kogyo Co., Ltd.), and magnesium stearate (manufactured by NOF Corp.) was prepared.

Each of the above-mentioned starting materials was charged into the same co-rotation-type twin-screw extrusion molding machine as the case of Example 4 (manufactured by Hitachi Zosen Corp.) so as to make a blend of 37% by weight of high-density polyethylene resin, 63% by weight of calcium carbonate (molded sheet confirmed by measurement according to JIS P8251-525° C. burning method) and 1% by weight of magnesium stearate (based on total amount of high-density polyethylene resin and calcium carbonate: 100%), and kneading and extrusion molding were conducted at conditions of temperature: kneading section 220° C. to 200° C., die section 180° C., screw revolution speed: 150 rpm, opening of lip: 0.6 mm. As a result, a thin film sheet intermediate body with the thickness of 270 μm and apparent specific gravity of 1.52 could be prepared.

In order to investigate the drawing property of the molded sheet, the tensile test was conducted at 95° C. by the method of JISK7127, and as a result of measuring the stretch (%), it was at least 369%, which was determined as being sufficiently drawable.

Therefore, a sample of the thin film sheet intermediate body molded was drawn at conditions of 96° C., preheating for 3 min, and draw rates both longitudinally and horizontally of 50 mm/min, using a two-axis simultaneous drawing test machine (Toyo Seiki Seisaku-Sho, Ltd.). As a result, the apparent specific gravity was 0.77 in the sample of the thin film sheet drawn 1.8 times longitudinally and horizontally, respectively, the whiteness of the thin film sheet before and after drawing (according to the method of JIS P8148) was 50% before drawing and 86% after drawing, and the opacity (according to the method of JIS P8149) was 97% before drawing and 100.0% after drawing, and thus both the whiteness and opacity both improved by drawing, and were similar to paper prepared from wood pulp, along with appearance and common paper quality.

Example 6

For the sample of the thin film sheet intermediate body molded in Example 5 (thickness of sheet 270 μm), longitudinal drawing employing the circumferential speed difference betweens rolls and horizontal drawing by way of a sheet-end fixing type tenter were conducted, and the effects of longitudinal drawing and the effects of sequential drawing in which longitudinal drawing followed by horizontal drawing were performed were investigated.

A longitudinal drawing machine (working width: max. 300 mm, system: roll type/non-contact type, manufactured by Ichikin Co., Ltd.) was used in longitudinal drawing, and a roll of the sample (300 mm width) was drawn at a temperature of 95° C. of the drawing section at an inlet velocity of 0.7 m/min.

A horizontal drawing machine (choke width: inlet 80 to max. 600 mm, outlet 300 to max. 1200 mm, system: grip type, manufactured by Ichikin Co., Ltd.) was used in horizontal drawing, and the sample (roll) subjected to longitudinal drawing was drawn at 95° C.

The results of longitudinal drawing and sequential drawing are as follows.

TABLE 1

Effect of drawing

| Before drawing | | Draw ratio | After drawing | | |
|---|---|---|---|---|---|
| Sample | Width (μm) | Ratio (times) | Thickness (μm) | Width (mm) | Apparent specific gravity |
| Longitudinal drawing | | | | | |
| 1. Intermediate body | 300 | 1.4 | 260 | 280 | 1.33 |
| 2. sample molded in | 300 | 2.0 | 230 | 258 | 1.25 |
| 3. Example 5 (thickness 270 μm) | 300 | 2.5 | 210 | 250 | 1.04 |
| Horizontal drawing (sequential drawing) | | | | | |
| 1. Sample longitudinally drawn 1.4 times | 280 | 1.4 | 200 | — | 0.95 |
| 2. Sample longitudinally drawn 2.0 times | 258 | 2.0 | 200 | — | 0.76 |

From the above results, it is found that the apparent specific gravity of a sheet can be vastly changed by varying the conditions of sequential drawing.

TABLE 2

Change in whiteness by drawing

| Before drawing Sample | After drawing | | |
|---|---|---|---|
| | Apparent specific gravity | Whiteness (%) | Opacity (%) |
| Longitudinal drawing | | | |
| 1. Intermediate body sample | 1.33 | 75 | 99 |
| 2. molded in Example 5 | 1.25 | 80 | 99 |
| 3. (thickness 270 μm) | 1.04 | 84 | 99 |
| Horizontal drawing (sequential drawing) | | | |
| 1. Sample longitudinally drawn 1.4 times | 0.95 | 87 | 100 |
| 2. Sample longitudinally drawn 2.0 times | 0.76 | 87 | 100 |

The apparent specific gravity of the sample prior to drawing was 1.52, the whiteness was 50.0% and the opacity was 97%.

From the above table, it has become clear that the whiteness improves accompanying the apparent specific gravity (density) declining by drawing.

The tensile strength was also measured according to the method of JIS P8113, and was 3.60 kN/m for a sample (1.33) longitudinally drawn 1.4 times in the above table. However, regarding tensile strength, the sample of 0.95 apparent specific gravity becomes 2.90 kN/m, and in the case of a sheet of inorganic substance powder high blending, a trend was seen of somewhat declining accompanying the apparent specific gravity declining by drawing.

For the samples after drawing, calendar processing was performed at a velocity of 2 m/min at a load of 3 tons with a horizontal-type Mini Super Calendar (combination of steel roll and resin roll, only steel roll heatable, manufactured by Yuri Roll Machine Co., Ltd.).

TABLE 3

Result of calendar processing

| Sample | Before processing | | Calendar temperature (° C.) | After processing | |
|---|---|---|---|---|---|
| | Thickness (μm) | Smoothness (sec) | | Thickness (μm) | Smoothness (sec) |
| 1.4-times longitudinally drawn sample | 260 | 132 | Room temperature | 240 | 355 |
| 2.0-times longitudinally drawn sample | 230 | 140 | 40 | 200 | 364 |

As understood from the above-mentioned results, the smoothness improved remarkably by way of calendar processing.

INDUSTRIAL APPLICABILITY

The thin film sheet of the present invention is remarkably improved both in printability (workability in printing, quality of printed matter) and processing suitability compared to a sheet into which conventional limestone is blended in abundance; therefore, it is expected to be given a second look in the printing and the processing field of paper, and the demand to increase. By goods being socially recognized, it can be expected that the environmental aspects such as not using wood and water and the energy savings in the manufacturing process being small will also be reassessed.

In addition to the development in the above such demanded field of paper, it is anticipated that the demand will also greatly extend to uses capitalizing on water resistance, which is a major characteristic of this sheet, e.g., labels, billboard materials, building materials, various bags, etc., and is considered to be applied not only for paper uses, but also partial uses in plastic films as new materials.

The invention claimed is:

1. A thin film sheet for printing that consists of a thermoplastic resin and inorganic substance powder and at least one optional auxiliary agent selected from the group consisting of a lubricant, a fluidity improving agent, a dispersant, an antioxidant, a UV absorbing agent, and a stabilizer,
   wherein the thermoplastic resin is high density polyethylene,
   wherein a weight ratio of the thermoplastic resin to the inorganic substance powder is 18:82 to 40:60, the inorganic substance powder has an average particle size of 0.5 to 15 μm and is free of particles with a particle size of at least 50 μm,
   wherein the film sheet has an apparent specific gravity of 0.55 to 1.40,
   wherein the high density polyethylene has a melt mass flow rate of 0.02 to 1.2 g/10 min, and
   wherein the inorganic substance powder is at least one selected from the group consisting of calcium carbonate, clay, silica, titanium oxide, talc, kaolin and aluminum hydroxide.

2. The thin film sheet according to claim 1, wherein the average particle size of the inorganic substance powder is 4.3 to 15 μm.

3. The thin film sheet of claim 1, wherein the high density polyethylene has a melt mass flow rate of 0.27 to 0.8 g/10 min.

4. The thin film sheet of claim 1, wherein 50% by weight to 100% by weight of the high-density polyethylene resin has a melt mass-flow rate of 0.02 to 0.5 g/10 min, and remainder of the high-density polyethylene resin has a melt mass-flow rate of 0.5 to 1.2 g/10 min.

* * * * *